United States Patent
Sato (10) Patent No.: US 9,570,875 B2
(45) Date of Patent: Feb. 14, 2017

(54) LASER OSCILLATOR INCLUDING FANS WHICH COOL RESONATOR UNIT

(71) Applicant: FANUC CORPORATION, Minamitsuru-gun, Yamanashi (JP)

(72) Inventor: Takanori Sato, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/019,059

(22) Filed: Feb. 9, 2016

(65) Prior Publication Data
US 2016/0233639 A1    Aug. 11, 2016

(30) Foreign Application Priority Data
Feb. 10, 2015  (JP) .................................. 2015-024517

(51) Int. Cl.
*H01S 3/04* (2006.01)
*H01S 3/042* (2006.01)
*H01S 3/041* (2006.01)

(52) U.S. Cl.
CPC ............ *H01S 3/0407* (2013.01); *H01S 3/041* (2013.01); *H01S 3/042* (2013.01); *H01S 3/04* (2013.01)

(58) Field of Classification Search
CPC ........ H01S 3/0407; H01S 3/041; H01S 3/042; H01S 3/04
USPC ....................................................... 372/35, 34
See application file for complete search history.

(56) References Cited

U.S. PATENT DOCUMENTS

| 4,096,450 A * | 6/1978 | Hill | H01S 3/093 313/46 |
| 4,712,609 A * | 12/1987 | Iversen | H01L 23/473 165/133 |

FOREIGN PATENT DOCUMENTS

| JP | H08-204263 A | 8/1996 |
| JP | 2992860 B | 12/1999 |

* cited by examiner

*Primary Examiner* — Kinam Park
(74) *Attorney, Agent, or Firm* — RatnerPrestia (57) ABSTRACT

A laser oscillator according to this invention includes a resonator unit, heat exchangers, fans, a resonator temperature measuring unit, and a fan control unit. The resonator unit resonates a laser beam to be output. The heat exchangers are arranged adjacent to the resonator unit and are to be supplied with a cooling liquid. The fans are arranged at least at one of two opposite positions across both the resonator unit and the heat exchangers and generate airflow in one direction, which passes through both the resonator unit and the heat exchangers. The resonator temperature measuring unit measures the temperature of the resonator unit. The fan control unit controls the fans. The fan control unit switches the direction in which air is blown by the fans, based on the temperature of the resonator unit.

6 Claims, 8 Drawing Sheets

ACTIVATION AT RELATIVELY HIGH TEMPERATURES

| STATE OF OSCILLATOR | TEMPERATURE OF RESONATOR UNIT | OPERATION OF FIRST FANS | OPERATION OF SECOND FANS |
|---|---|---|---|
| OFF | TEMPERATURE OF COOLING WATER OR MORE | OFF | OFF |
| EVACUATION | TEMPERATURE OF COOLING WATER OR MORE | FROM LEFT TO RIGHT (→) | FROM LEFT TO RIGHT (→) |
| START OF GAS PRESSURE CONTROL | TEMPERATURE OF COOLING WATER OR MORE | FROM LEFT TO RIGHT (→) | FROM LEFT TO RIGHT (→) |
| ACTIVATION OF TURBO BLOWER | TEMPERATURE OF COOLING WATER OR MORE | FROM LEFT TO RIGHT (→) | FROM LEFT TO RIGHT (→) |
| START OF DISCHARGE | TEMPERATURE OF COOLING WATER OR MORE | FROM LEFT TO RIGHT (→) | FROM LEFT TO RIGHT (→) |
| COMPLETION OF PREPARATION FOR OSCILLATION | TEMPERATURE OF COOLING WATER OR MORE | FROM LEFT TO RIGHT (→) | FROM LEFT TO RIGHT (→) |

FIG. 5B

ACTIVATION AT LOW TEMPERATURES

| STATE OF OSCILLATOR | TEMPERATURE OF RESONATOR UNIT | OPERATION OF FIRST FANS | OPERATION OF SECOND FANS |
|---|---|---|---|
| OFF | LESS THAN TEMPERATURE OF COOLING WATER | OFF | OFF |
| EVACUATION | LESS THAN TEMPERATURE OF COOLING WATER | FROM RIGHT TO LEFT (←) | FROM RIGHT TO LEFT (←) |
| START OF GAS PRESSURE CONTROL | LESS THAN TEMPERATURE OF COOLING WATER | FROM RIGHT TO LEFT (←) | FROM RIGHT TO LEFT (←) |
| ACTIVATION OF TURBO BLOWER | LESS THAN TEMPERATURE OF COOLING WATER | FROM RIGHT TO LEFT (←) | FROM RIGHT TO LEFT (←) |
| START OF DISCHARGE | LESS THAN TEMPERATURE OF COOLING WATER | FROM RIGHT TO LEFT (←) | FROM RIGHT TO LEFT (←) |
| WARM-UP OPERATION | LESS THAN TEMPERATURE OF COOLING WATER | FROM RIGHT TO LEFT (←) | FROM RIGHT TO LEFT (←) |
| COMPLETION OF PREPARATION FOR OSCILLATION | TEMPERATURE OF COOLING WATER OR MORE | FROM LEFT TO RIGHT (→) | FROM LEFT TO RIGHT (→) |

FIG. 5C

RETURN FROM STANDBY STATE AT LOW TEMPERATURES

| STATE OF OSCILLATOR | TEMPERATURE OF RESONATOR UNIT | OPERATION OF FIRST FANS | OPERATION OF SECOND FANS |
|---|---|---|---|
| COMPLETION OF PREPARATION FOR OSCILLATION | TEMPERATURE OF COOLING WATER OR MORE | FROM LEFT TO RIGHT (→) | FROM LEFT TO RIGHT (→) |
| ON STANDBY | TEMPERATURE OF COOLING WATER OR MORE | OFF | OFF |
| ON STANDBY | LESS THAN TEMPERATURE OF COOLING WATER | OFF | OFF |
| START OF DISCHARGE | LESS THAN TEMPERATURE OF COOLING WATER | FROM RIGHT TO LEFT (←) | FROM RIGHT TO LEFT (←) |
| WARM-UP OPERATION | LESS THAN TEMPERATURE OF COOLING WATER | FROM RIGHT TO LEFT (←) | FROM RIGHT TO LEFT (←) |
| COMPLETION OF PREPARATION FOR OSCILLATION | TEMPERATURE OF COOLING WATER OR MORE | FROM LEFT TO RIGHT (→) | FROM LEFT TO RIGHT (→) |

LASER OSCILLATOR INCLUDING FANS WHICH COOL RESONATOR UNIT

FIELD OF THE INVENTION

The present invention relates to a laser oscillator which employs a scheme of cooling the interior of a housing using cooling water and, more particularly, to control of fans which cool a resonator unit placed in a housing for a laser oscillator used in a laser processing machine.

DESCRIPTION OF THE RELATED ART

A laser processing machine which, for example, shaves or cuts a metal by irradiating the metal with a laser beam has been known and is equipped with a laser oscillator.

A laser oscillator includes a resonator unit which excites a laser medium (for example, $CO_2$ or YAG) and allows light emitted by the excited laser medium to make a round trip between two reflectors to amplify the light. More specifically, the resonator unit includes an axis type oscillating unit (for example, discharge tubes or YAG rods) which excites a laser medium to oscillate a laser beam, and a total reflector and a half reflector respectively disposed at the two ends of the oscillating unit in the optical axis direction. Therefore, the laser oscillator includes a housing which accommodates and protects the resonator unit.

The laser oscillator preferably cools the resonator unit and the housing and is known to be implemented in a scheme of cooling the interior of the housing using cooling water, i.e., the water-cooled type.

Conventionally, heat exchangers are interposed between the above-mentioned resonator unit and fans in the housing of the water-cooled laser oscillator.

In lowering the temperature in the housing heated due to heat generated by the resonator unit, cooling water is controlled at a constant temperature and supplied to the heat exchangers by a cooling device such as a chiller. The fans are operated to take in hot air in the vicinity of the resonator unit, thereby bringing the hot air into contact with the heat exchangers to cool it and blowing the cold air to the vicinity of the resonator unit.

The operation of the cooling fans as mentioned above is executed simultaneously with the activation of the laser oscillator. Further, since only a little heat is generated by the resonator unit, the fans may not be operated when the interior of the housing may not be cooled. Thus, the fans are operated only upon a rise in temperature within the housing to reduce the power consumption of the laser oscillator.

As conventional exemplary control of fans in the housing of the water-cooled laser oscillator, methods are described in Japanese Patent No. 2992860 and Japanese Laid-open Patent Publication No. H8-204263.

Japanese Patent No. 2992860 describes a method for changing the rotational speeds of the fans in accordance with the temperature of cooling water or the power supplied to the laser oscillator to lower the temperature of the cooling water.

Japanese Laid-open Patent Publication No. H8-204263 describes a method for providing a cooling gas passage formed in contact with a semiconductor laser array, a cooling gas stream generation unit which supplies a cooling gas stream to the cooling gas passage, and a temperature detection unit for the semiconductor laser array, and controlling the driving of the cooling gas stream generation unit, based on a signal detected by the temperature detection unit.

Laser processing machines may be positioned not only at constant-temperature locations such as a temperature-controlled room but also at variable-temperature locations such as the indoor space of a factory where the atmospheric temperature lowers or even its outdoor space. Especially in winter, when the laser oscillator is activated at low ambient temperatures, a warm-up operation is preferably performed until the temperature of the resonator unit reaches a steady state upon a rise in temperature within the housing. In other words, as a problem, it takes a certain time for the laser oscillator to become usable after the activation of the laser oscillator.

In addition, the conventional water-cooled laser oscillator controls the fans and the direction in which air is blown by these fans, to lower the temperature of especially the resonator unit in the housing. When the conventional water-cooled laser oscillator is employed as a laser processing machine, cold air in the housing is blown to the resonator unit during the above-mentioned warm-up operation, so it becomes difficult to raise the temperature of the resonator unit, contrary to the intention. This also results in the prolongation of the warm-up time.

Further, to reduce the power consumption of the laser oscillator in the laser processing machine, when laser processing is suspended, the excitation operation of the laser medium and the rotation of the fans are stopped and the laser oscillator is kept on standby. When, however, the ambient temperature of the laser oscillator is low, the temperatures of members constituting the resonator unit lower as the OFF time of the resonator unit prolongs. This poses still another problem: the operation of the laser oscillator is unstable until the temperature of the resonator unit reaches a steady state upon a transition of the laser oscillator from a standby state to a ready-for-laser machining state.

SUMMARY OF INVENTION

The present invention provides a laser oscillator capable of becoming usable in a shorter period of time after the activation or restart of the laser oscillator at low temperatures.

The present invention in its first aspect provides a laser oscillator including a resonator unit, a heat exchanger, a fan, a resonator temperature measuring unit, and a fan control unit. The resonator unit resonates a laser beam to be output. The heat exchanger is arranged adjacent to the resonator unit and is to be supplied with a cooling liquid. The fan is arranged at least at one of two opposite positions across both the resonator unit and the heat exchanger and generates airflow in one direction, which passes through both the resonator unit and the heat exchanger. The resonator temperature measuring unit measures the temperature of the resonator unit. The fan control unit controls the fan. With the laser oscillator according to the first aspect, the fan control unit switches the direction in which air is blown by the fan, based on the temperature of the resonator unit measured by the resonator temperature measuring unit.

The present invention in its second aspect provides the laser oscillator according to the first aspect, wherein when the measured temperature of the resonator unit is lower than a predetermined temperature, the fan control unit adjusts the direction in which the air is blown by the fan to the direction from the heat exchanger to the resonator unit, and when the measured temperature of the resonator unit is equal to or higher than the predetermined temperature, the fan control unit adjusts the direction in which the air is blown by the fan to the direction from the resonator unit to the heat exchanger.

The present invention in its third aspect provides the laser oscillator according to the first or second aspect, wherein a plurality of fans are arranged in the longitudinal direction of the resonator unit, and the fan control unit changes the air volume of at least one of the plurality of fans, based on the measured temperature of the resonator unit.

The present invention in its fourth aspect provides the laser oscillator according to any one of the first to third aspects, wherein a plurality of fans are arranged in the longitudinal direction of the resonator unit, and the fan control unit stops at least one of the plurality of fans, based on the measured temperature of the resonator unit.

The present invention in its fifth aspect provides the laser oscillator according to the second aspect, further including a cooling liquid temperature measuring unit which measures the temperature of the cooling liquid, wherein the above-mentioned predetermined temperature is equal to the temperature of the cooling liquid measured by the cooling liquid temperature measuring unit.

The present invention in its sixth aspect provides the laser oscillator according to any one of the first to fifth aspects, further including a chiller for controlling the cooling liquid at a constant temperature.

These and other objects, features and advantages of the present invention will become more apparent from a detailed description of a typical embodiment of the present invention which is illustrated in the accompanying drawings.

DETAILED DESCRIPTION

An embodiment of the present invention will be described below with reference to the accompanying drawings. Although the following description assumes a fast speed axial flow-type gas laser device as an exemplary laser oscillator, the present invention is not limited to this.

Figure 1:
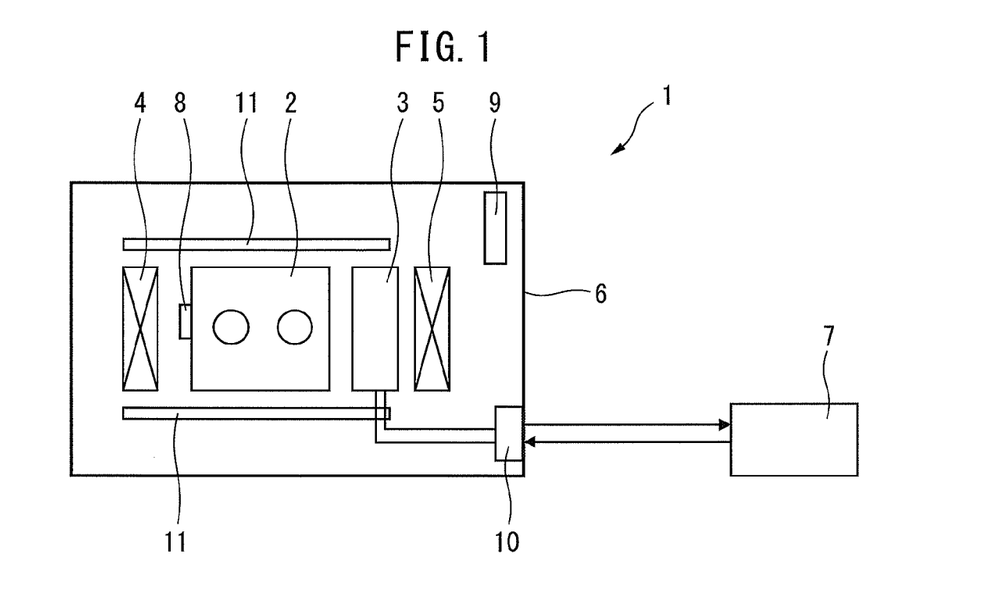
FIG. 1 is a front view schematically illustrating the configuration of a laser oscillator according to an embodiment of the present invention.

FIG. 1 is a front view schematically illustrating the configuration of a laser oscillator according to an embodiment of the present invention.

A laser oscillator 1 according to this embodiment includes a resonator unit 2 for resonating a laser beam to be output, heat exchangers 3 located adjacent to one end of the resonator unit 2, and first fans 4 and second fans 5 respectively located at two opposite positions across both the resonator unit 2 and the heat exchangers 3.

The laser oscillator 1 further includes a housing 6 which accommodates and protects the resonator unit 2, the heat exchangers 3, and the fans 4 and 5. A chiller 7 which supplies cooling water being controlled at a constant temperature of, e.g., 20° C. is located outside the housing 6. Although water is used as a cooling liquid to be supplied to the heat exchangers 3 in this embodiment, the present invention is not limited to this.

The housing 6 contains a resonator temperature measuring unit 8 which measures the temperature of the resonator unit 2, a fan control unit 9 which controls the fans 4 and 5, and a cooling water temperature measuring unit 10 which measures the temperature of the cooling water flowing between the heat exchangers 3 and the chiller 7.

Although FIG. 1 depicts the fan control unit 9 and the cooling water temperature measuring unit 10 as placed within the housing 6, their positions are not limited to those represented in FIG. 1, and the fan control unit 9 and the cooling water temperature measuring unit 10 may be located, e.g., outside the housing 6.

Figure 4A:
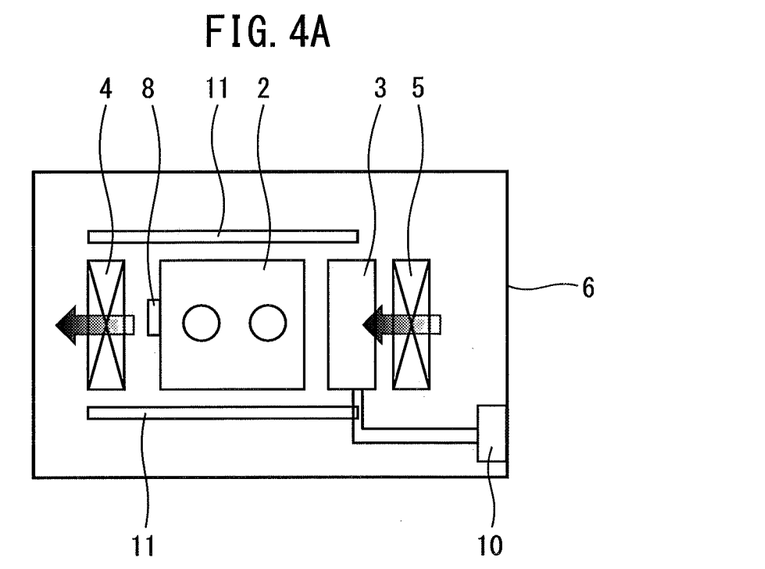
FIG. 4A is a view depicting the direction of airflow generated by forward rotation of the fans.
Figure 4B:
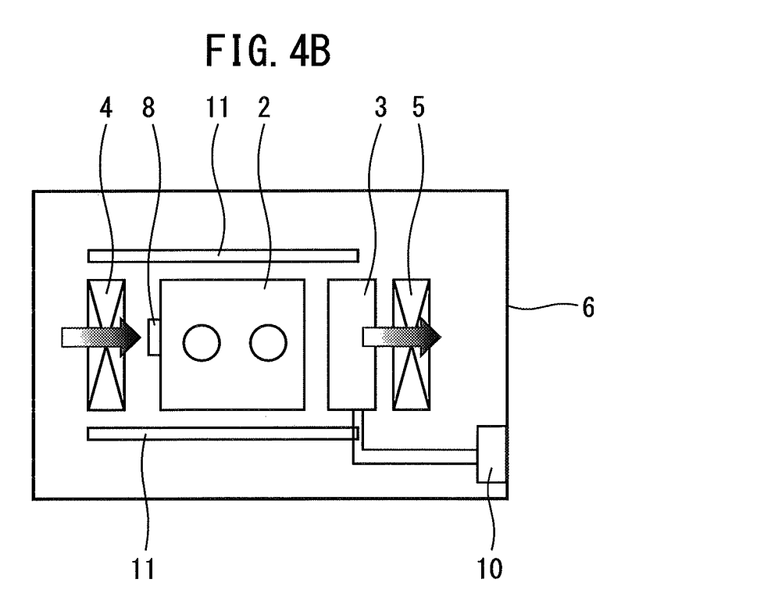
FIG. 4B is a view depicting the direction of airflow generated by reverse rotation of the fans.

The fan control unit 9 generates airflow in one direction using both the first fans 4 and the second fans 5 (see arrows represented in FIGS. 4A and 4B). However, as long as the fans can generate the airflow in one direction, it suffices to arrange them at least at one of two opposite positions across both the resonator unit and the heat exchangers. To efficiently supply such airflow in one direction to the resonator unit 2 and the heat exchangers 3, the resonator unit 2 is preferably surrounded by the two fans 4 and 5 and two plate-shaped members 11, as illustrated as FIG. 1.

Figure 2:
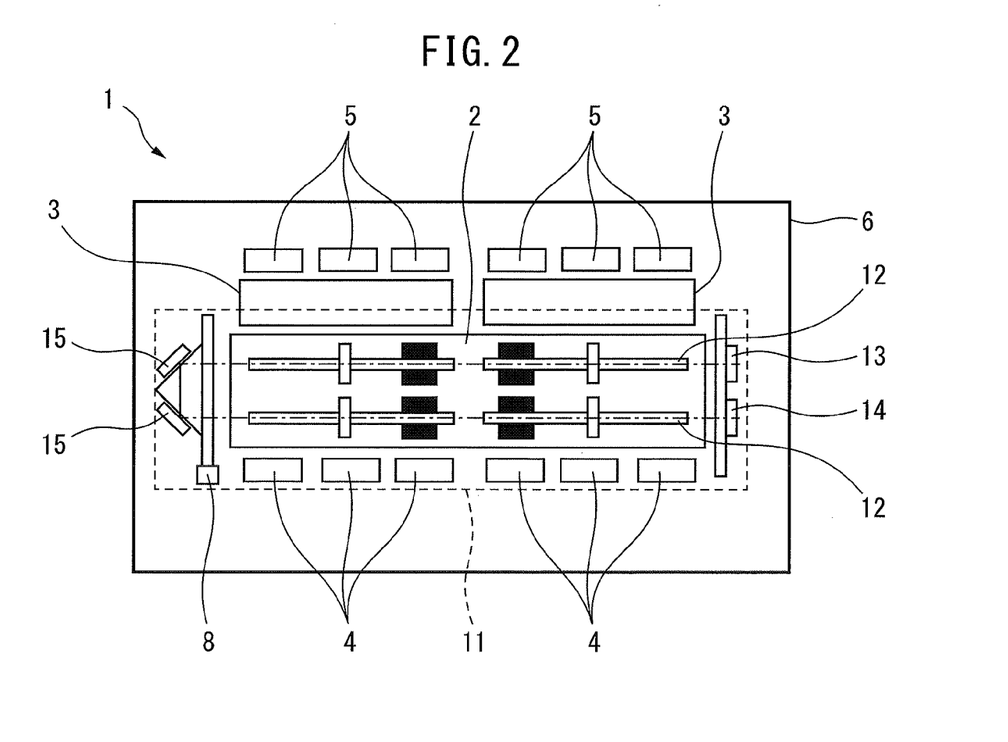
FIG. 2 is a top view schematically illustrating the configuration of the laser oscillator according to the embodiment of the present invention.

The configuration of the resonator unit 2 will be described in more detail with reference to FIG. 2. FIG. 2 is a top view schematically illustrating the configuration of the laser oscillator 1 illustrated as FIG. 1.

The resonator unit 2 includes an axis type discharge unit which accommodates a gas (for example, $CO_2$) serving as a laser medium and excites the gas by electric discharge to emit a laser beam. The axis type discharge unit includes, e.g., a series-connection of four discharge tubes 12 which are folded in units of two discharge tubes 12 and arranged in the housing 6. A total reflector 13 and a half reflector 14 (output coupler) are respectively disposed at the two ends of such a discharge unit in the optical axis direction. A folding mirror 15 is disposed at the intermediate position of the discharge unit.

The total number of discharge tubes 12 and the unit number of discharge tubes to be folded are not limited to the above-mentioned numbers.

Six fans 4 are sequentially arranged in the longitudinal direction of the resonator unit 2 on one side (the lower side in FIG. 2) of the resonator unit 2. Two heat exchangers 3 are sequentially arranged in the longitudinal direction of the resonator unit 2 on the other side (the upper side in FIG. 2) of the resonator unit 2. Six fans 5 are sequentially arranged in the longitudinal direction of the heat exchangers 3 to be adjacent to the heat exchangers 3.

In other words, the heat exchangers 3 are arranged adjacent to one end of the resonator unit 2 in the housing 6 between the resonator unit 2 and the second fans 5. The first fans 4 are arranged adjacent to the other end of the resonator unit 2 (see FIG. 1).

The numbers of heat exchangers 3 and fans 4 and 5 are not limited to the above-mentioned numbers.

Figure 3:
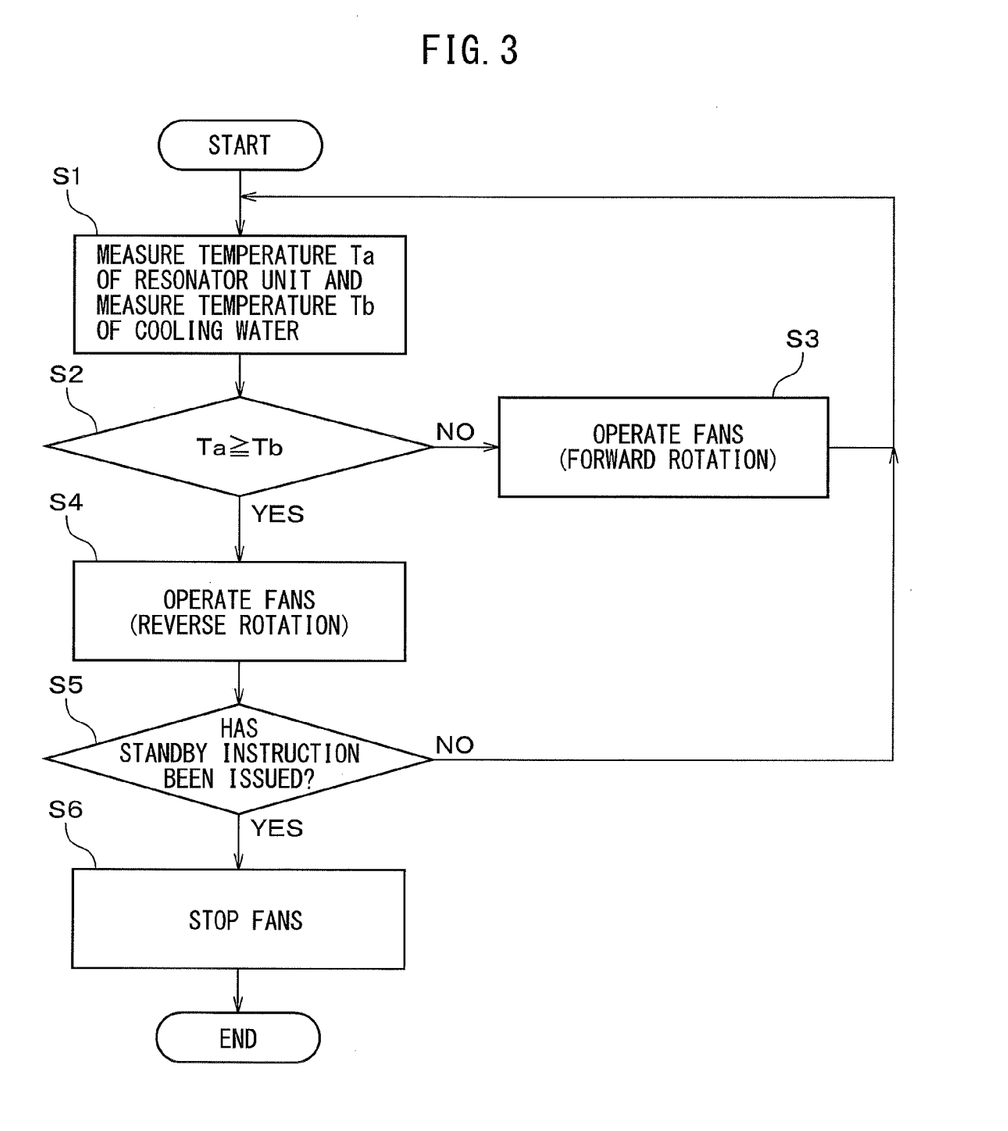
FIG. 3 is a flowchart illustrating the control sequence of fans according to the embodiment.

A method for controlling the fans 4 and 5 placed in the housing 6 of the laser oscillator 1 will be described next. FIG. 3 illustrates the control sequence of the fans 4 and 5.

Referring to FIG. 3, first, a temperature Ta of the resonator unit 2 is measured by the resonator temperature measuring unit 8, and a temperature Tb of cooling water supplied from the chiller 7 to the heat exchangers 3 is measured by the cooling water temperature measuring unit 10 (step S1).

In step S2, the temperature Ta of the resonator unit 2 and the temperature Tb of the cooling water are compared with each other. When the temperature Ta of the resonator unit 2 is determined to be lower than the temperature Tb of the cooling water (Ta<Tb), the fans 4 and 5 are rotated forwardly (step S3). The direction of airflow generated by the forward rotation of the fans 4 and 5 is indicated by arrows in FIG. 4A. In other words, when the temperature Ta of the resonator unit 2 is lower than the temperature Tb of the cooling water, an air current to flow from the heat exchangers 3 to the resonator unit 2 is formed by the fans 4 and 5.

Such steps S1 to S3 continue until the temperature Ta of the resonator unit 2 becomes equal to or higher than the temperature Tb of the cooling water.

When it is determined in step S2 that the temperature Ta of the resonator unit 2 is equal to or higher than the temperature Tb of the cooling water (Ta≥Tb), the fans 4 and 5 are rotated reversely (step S4). The direction of airflow generated by the reverse rotation of the fans 4 and 5 is indicated by arrows in FIG. 4B. When the temperature Ta of the resonator unit 2 is equal to or higher than the temperature Tb of the cooling water, an air current to flow from the resonator unit 2 to the heat exchangers 3 is formed by the fans 4 and 5.

After step S4, when no instruction is issued to keep the laser oscillator 1 on standby; the fans 4 and 5 are operated in accordance with steps S1 to S4 in the period from the activation until the completion of preparation for oscillation of the laser oscillator 1. However, when an instruction is issued to keep the laser oscillator 1 on standby, the fans 4 and 5 are stopped (steps S5 and S6).

The timing of the start of the above-mentioned control sequence includes not only the activation of the laser oscillator 1 but also the restart of the laser oscillator 1 in a standby state.

Although FIG. 3 illustrates an exemplary comparison between the measured temperatures of the resonator unit 2 and the cooling water, the present invention is not limited to this.

For example, instead of steps S1 and S2 in FIG. 3, a method for controlling the operation of the fans 4 and 5 by comparing the measured temperature of the resonator unit 2 with a preset temperature (for example, 20° C.) may be used. This preset temperature can be defined as the temperature, at which an adjusting operation is performed at the time of manufacture, such as optical axis adjustment of the resonator, to allow members constituting the resonator to reproduce the state during adjustment and, in turn, to most efficiently obtain a laser output.

The operation of the fans 4 and 5 in the period from the activation until the completion of preparation for oscillation of the laser oscillator 1 will be described next.

Figure 5A:
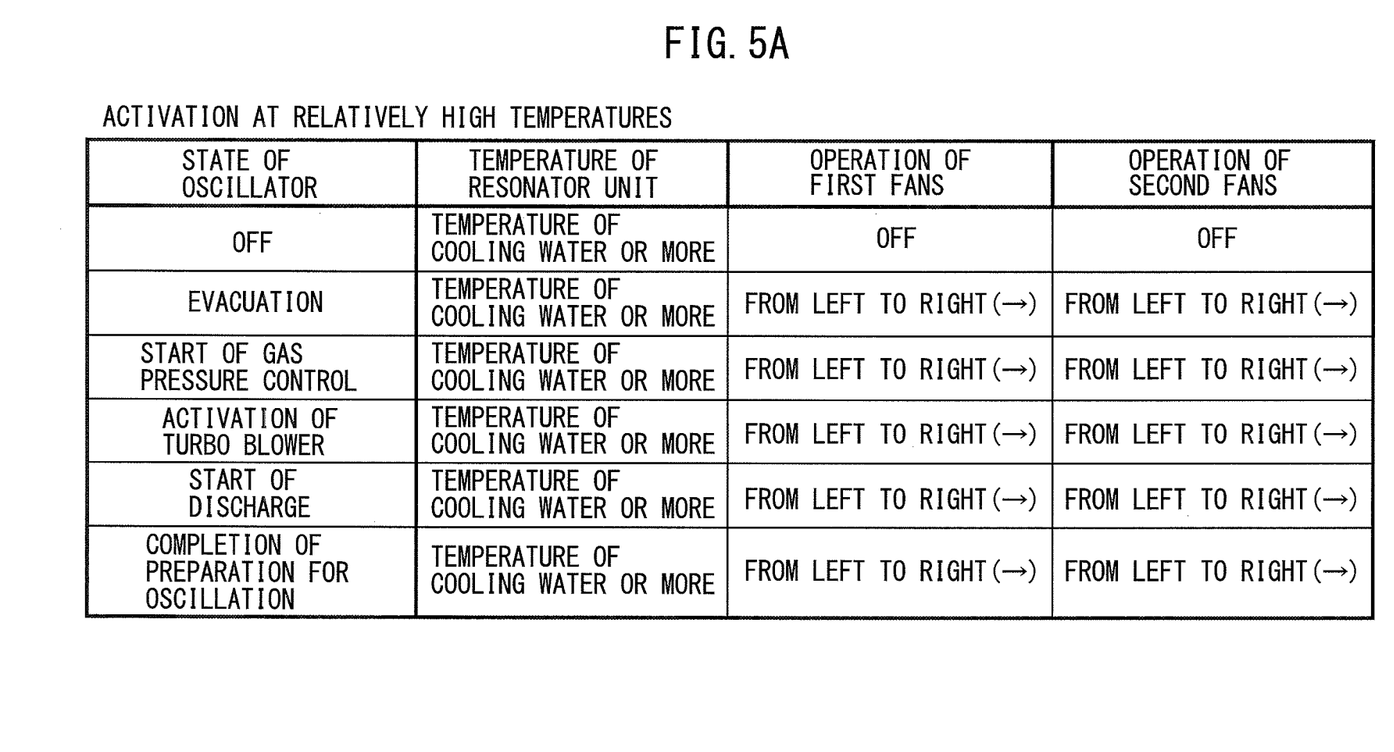
FIG. 5A is a table illustrating the operation of the fans corresponding to the temperature of a resonator unit when the laser oscillator is activated at relatively high temperatures.
Figure 5B:
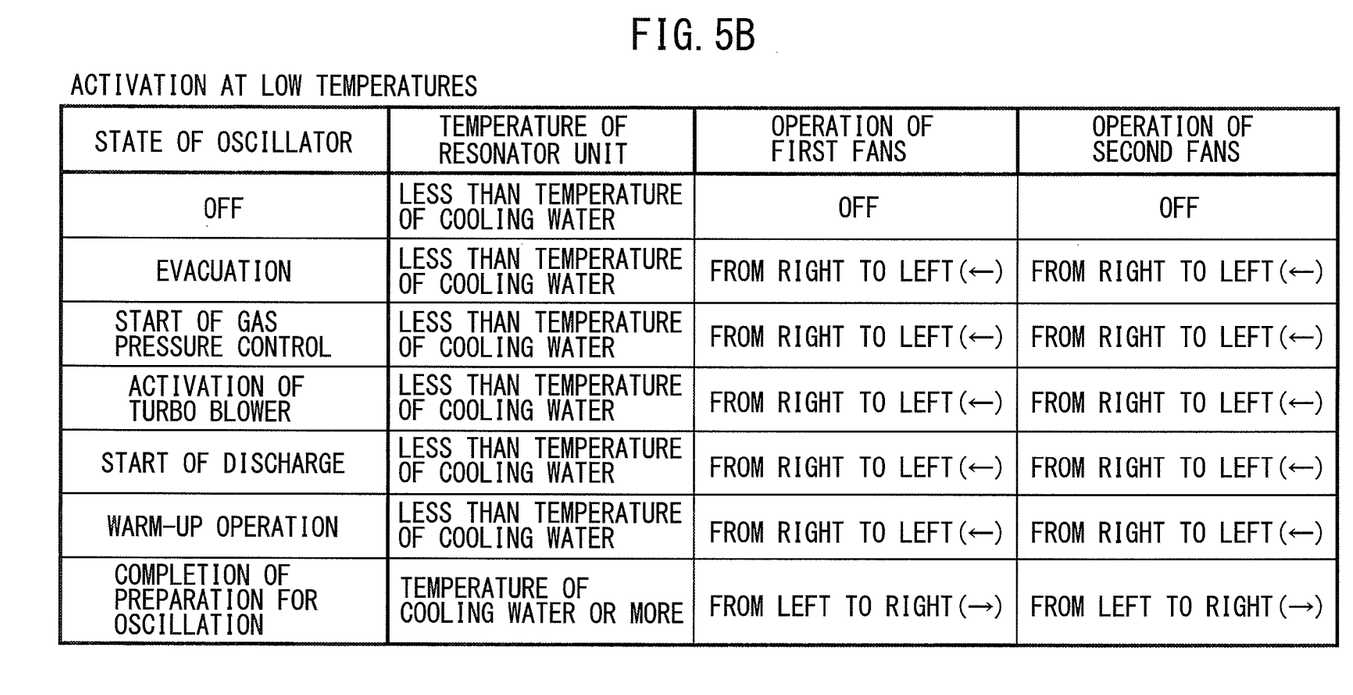
FIG. 5B is a table illustrating the operation of the fans corresponding to the temperature of the resonator unit when the laser oscillator is activated at low temperatures.
Figure 5C:
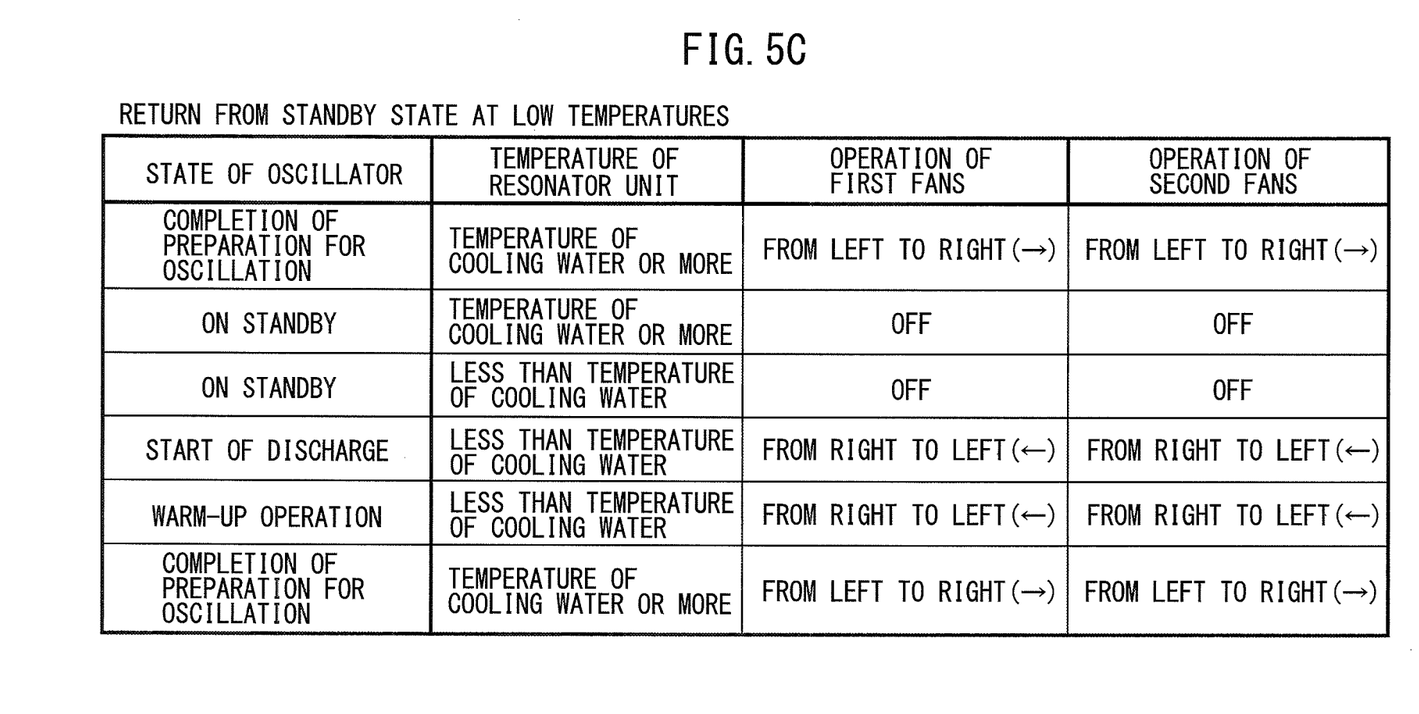
FIG. 5C is a table illustrating the operation of the fans corresponding to the temperature of the resonator unit when the laser oscillator is returned from a standby state.

FIGS. 5A, 5B, and 5C illustrate the operation of the fans 4 and 5 corresponding to the operational state of the laser oscillator 1 and the temperature of the resonator unit 2. In particular, FIG. 5A exemplifies the activation of the laser oscillator 1 at relatively high temperatures, FIG. 5B exemplifies the activation of the laser oscillator 1 at low temperatures, and FIG. 5C exemplifies the return of the laser oscillator 1 from a standby state.

When the laser oscillator 1 functioning as a fast speed axial flow type $CO_2$ laser device is activated in an OFF state, a computer numerical control device (not illustrated) for the $CO_2$ laser device executes the processes represented as the leftmost column of FIG. 5A in turn from the top to the bottom. In other words, the computer numerical control device sequentially executes a series of processes: 1. The discharge tubes 12 are evacuated; 2. Gas pressure control in the discharge tubes 12 is started; 3. A turbo blower (not illustrated) for circulating $CO_2$ gas through the discharge tubes 12 at fast speed is actuated; 4. Discharge into the discharge tubes 12 is started; 5. Preparation for oscillation is completed.

Note, however, that when the temperature of the resonator unit 2 is lower than the set value even after the start of discharge into the discharge tubes 12, a warm-up operation is preferably performed, as represented as respective leftmost columns of FIGS. 5B and 5C. The "warm-up operation" means herein continuation of laser oscillation while no laser beam is emitted by the laser oscillator 1. Gas supply and discharge into the discharge tubes 12 allow the resonator unit 2 to generate heat to heat the interior of the housing 6.

In suspending laser processing, the discharge into the discharge tubes 12 and the rotation of the fans 4 and 5 are preferably stopped to shift the laser oscillator 1 to a standby state. This makes it possible to reduce the power consumption of the laser oscillator 1. In restarting laser processing, preparation for oscillation is completed by starting the discharge into the discharge tubes 12 and the operation of the fans 4 and 5.

When the laser oscillator 1 that executes the above-described processes is activated at relatively high ambient temperatures, the temperature of the resonator unit 2 is equal to or higher than that of the cooling water. Therefore, for each process represented as the leftmost column of FIG. 5A, the fans 4 and 5 generate an air current to flow from the left to the right in FIG. 4B. In other words, airflow generated by the fans 4 and 5 is supplied from the resonator unit 2 to the heat exchangers 3. With this arrangement, the heat exchangers 3 remove heat from the air surrounding the resonator unit 2, thus lowering the air temperature.

The air having its temperature lowered is discharged from the second fans 5, enters the first fans 4 along the inner surface of the housing 6, and is blown to the resonator unit 2 by the first fans, 4. Such air blowing maintains the temperature of the resonator unit 2 steady to stabilize the laser output and the beam mode.

When the laser oscillator 1 is used in a cold area, the resonator unit 2 and the housing 6 have temperatures as low as the ambient temperature so that the laser oscillator 1 may be activated at low temperatures. On the other hand, the chiller 7 that supplies cooling water maintains the cooling water at temperatures which do not freeze it. In particular, the chiller 7 according to this embodiment is equipped with, e.g., an antifreeze function, i.e., a function of enabling a water pump and a heater which heats cooling water and maintains the cooling water with its temperature raised to about 20° C.

In the above-mentioned case, the temperature of the resonator unit 2 is lower than that of the cooling water. Therefore, for each process represented as the leftmost column of FIG. 5B, the fans 4 and 5 generate an air current to flow from the right to the left in FIG. 4A. In other words, airflow generated by the fans 4 and 5 is blown from the heat exchangers 3 to the resonator unit 2. With this arrangement, the air passing through the heat exchangers 3 receives heat from the heat exchangers 3, thus raising the air temperature. The air having its temperature raised is blown to the resonator unit 2, which can then be heated.

As described above, the operation for heating the resonator unit 2 can heat the resonator unit 2 not only during a warm-up operation but also in the process before the warm-up operation. This makes it possible to shorten the time taken for the laser oscillator 1 to complete preparation for oscillation from an OFF state at low temperatures.

It is often the case that laser processing is suspended and the laser oscillator 1 is kept on standby. At this time, when the ambient temperature of the laser oscillator 1 is low, the resonator unit 2 and the housing 6 have temperatures as low as the ambient temperature so that the laser oscillator 1 may be activated at low temperatures. In this case as well, the temperature of the resonator unit 2 is lower than that of the cooling water. Therefore, in restarting the laser oscillator 1 in a standby state, as represented as the leftmost column of FIG. 5C, the fans 4 and 5 generate an air current to flow from the right to the left in FIG. 4A. In other words, the resonator unit 2 can be heated by blowing airflow from the heat exchangers 3 to the resonator unit 2 by the fans 4 and 5.

In restarting the laser oscillator 1 in a standby state at low temperatures, the above-mentioned arrangement can shorten the time taken for the laser oscillator 1 to become usable.

As described above, according to this embodiment, in the period from the activation until the completion of preparation for oscillation of the laser oscillator 1, the measured temperature of the resonator unit 2 is compared with the measured temperature of the cooling water or the set temperature of the resonator unit 2 and the operation of the fans 4 and 5 and the direction in which air is blown by these fans are switched based on the comparison result. At this time, in this embodiment, the following fan control is more preferably employed.

Figure 6A:
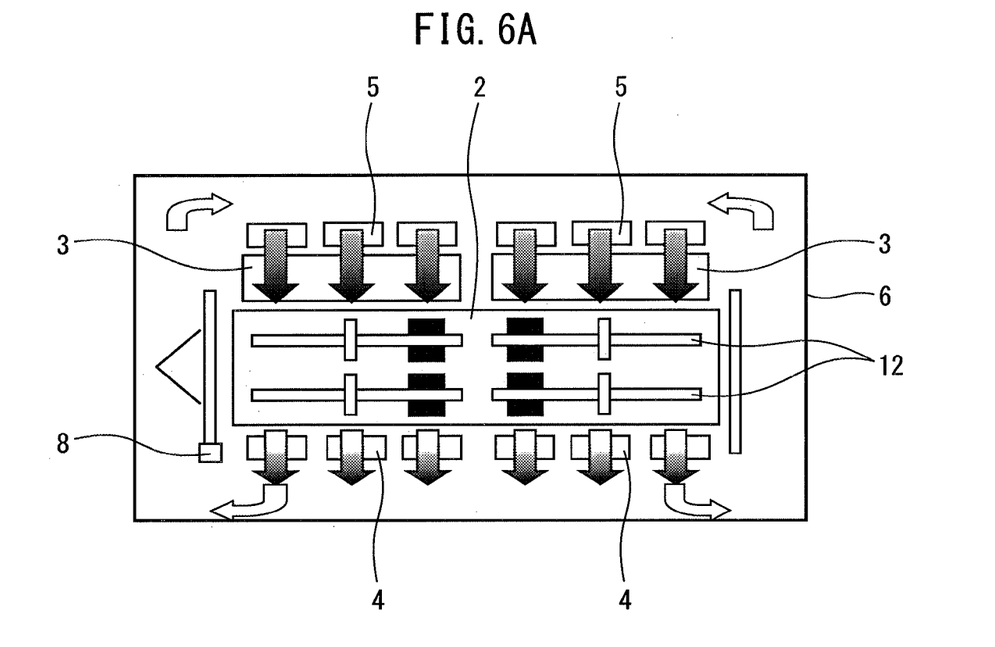
FIG. 6A is a first view depicting exemplary control of the fans according to the embodiment.
Figure 6B:
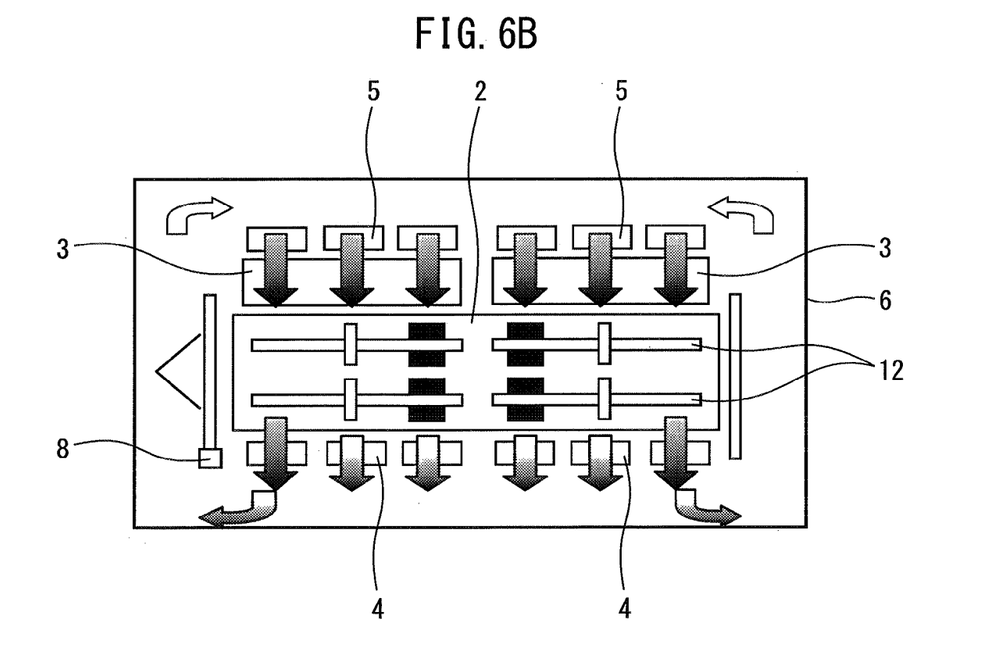
FIG. 6B is a second view depicting the exemplary control of the fans according to the embodiment.
Figure 6C:
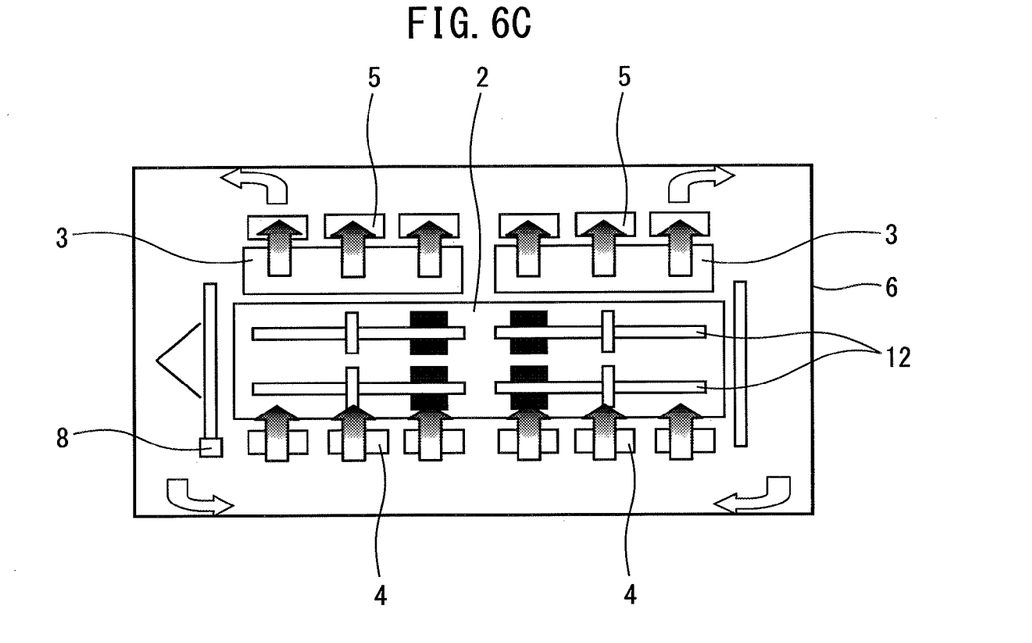
FIG. 6C is a third view depicting the exemplary control of the fans according to the embodiment.

FIGS. 6A, 6B, and 6C are views depicting exemplary control of the fans 4 and 5 according to this embodiment, in which the direction to blow air by these fans is illustrated as FIG. 2. More specifically, FIGS. 6A and 6B illustrate exemplary fan control when the measured temperature of the resonator unit 2 is lower than the measured temperature of the cooling water or the set temperature of the resonator unit 2, and FIG. 6C illustrates exemplary control when the measured temperature of the resonator unit 2 is equal to or higher than the measured temperature of the cooling water or the set temperature of the resonator unit 2. Arrows represented in FIGS. 6A, 6B, and 6C indicate air currents generated by the fans 4 and 5 in the housing 6, and the lengths of these arrows indicate the air volumes.

When the measured temperature of the resonator unit 2 is equal to or higher than the measured temperature of the cooling water or the set temperature of the resonator unit 2, the air volumes of the first fans 4 and the second fans 5 are set equal to each other, as illustrated as FIG. 6A. However, when the measured temperature of the resonator unit 2 is lower than the measured temperature of the cooling water or the set temperature of the resonator unit 2, the direction in which air is blown by both the fans 4 and 5 is switched to the direction opposite to that illustrated in FIG. 6C and the rotational speed of the second fans 5 is set higher than that of the first fans 4, as illustrated as FIG. 6A. In other words, the air volume of the second fans 5 is set larger than that of the first fans 4. This makes it possible to accelerate a rise in temperature of the air surrounding the resonator unit 2.

In the exemplary control illustrated as FIG. 6A, the resonator temperature measuring unit 8 is preferably spaced apart from high-temperature portions such as the heat exchangers 3 and the discharge tubes 12 so as to determine the temperature of the entire resonator unit 2. Therefore, as long as the temperature of the entire resonator unit 2 can be determined, the position of the resonator temperature measuring unit 8 is not limited to that illustrated as FIG. 6A.

As illustrated as FIG. 6B, relative to the exemplary control illustrated as FIG. 6A, the air volume of only the two first fans 4 arranged near the two ends, respectively, of the resonator unit 2 may be set higher than that of the remaining first fans 4. Thus, an air stream for heating the resonator unit 2 can be efficiently produced in the housing 6.

The fans to have a higher air volume are not limited to the two first fans 4 arranged near the two ends, respectively, of the resonator unit 2, as a matter of course. The fans 4 and 5 near portions having temperatures lower than those of the remaining portions in the resonator unit 2, for example, may have a higher air volume. In this case, the temperature distribution of the resonator unit 2 may be obtained in advance by an operational experiment and stored in a storage device (not illustrated) to change the air volume of at least one of the plurality of fans 4 and 5, based on the obtained temperature distribution data. Alternatively, in addition to the resonator temperature measuring unit 8, a plurality of temperature measuring units (not illustrated) may be arranged over the entire resonator unit 2 to determine the temperature distribution of the resonator unit 2 and change the air volume of at least one of the plurality of fans 4 and 5, based on the values measured by these temperature measuring units. Such control makes it possible to supply a larger amount of hot air to portions having relatively low temperatures, thus uniformly heating the resonator unit 2.

Figure 7:
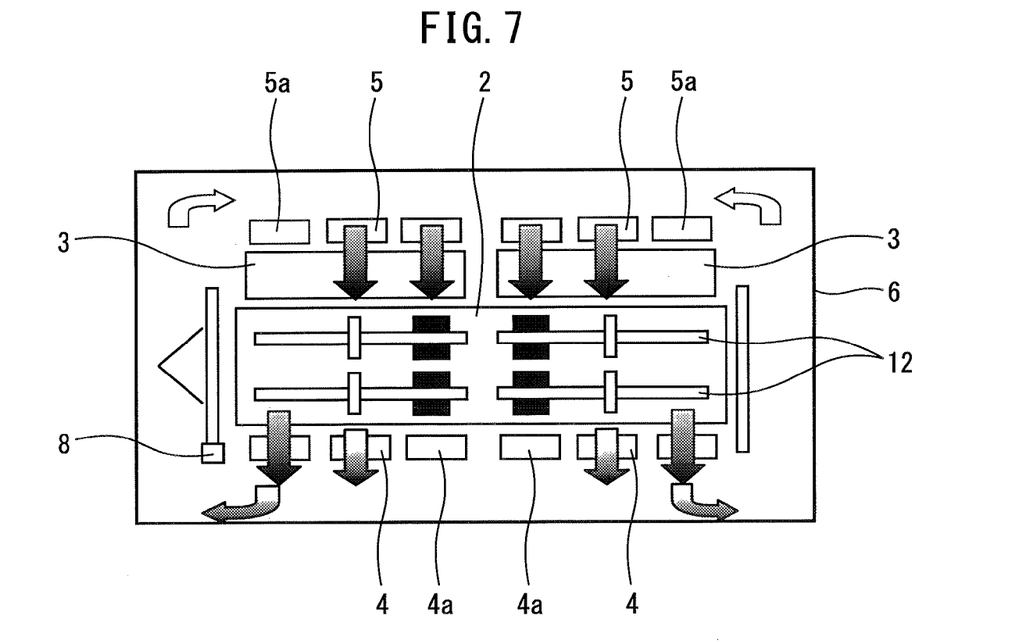
FIG. 7 is a view depicting another exemplary control of the fans according to the embodiment.

FIG. 7 is a view depicting another exemplary control of the fans 4 and 5 according to this embodiment, in which the direction to blow air by these fans is illustrated as FIG. 2.

In the above-described exemplary control illustrated as FIGS. 6A and 6B, when the measured temperature of the resonator unit 2 is lower than the measured temperature of the cooling water or the set temperature of the resonator unit 2, all fans 4 and all fans 5 are operated to supply air from the heat exchangers 3 to the resonator unit 2. However, the operation of some (fans 4a and 5a) of the plurality of fans 4 and 5 may be stopped, as in the example illustrated as FIG. 7. In other words, all or some of the plurality of fans 4 and 5 are preferably operated in accordance with the obtainable temperature distribution of the resonator unit 2, as mentioned earlier. This makes it possible to supply air heated by heat-generating portions of the resonator unit 2 to its non-heat-generating portions, thus uniformly heating the resonator unit 2.

As described above, independent or combined control of the direction in which air is blown by the fans 4 and 5 and their airflow volumes (rotational speeds) makes it possible to shorten the time taken for the laser oscillator 1 to complete preparation for oscillation after the activation or restart of the laser oscillator 1 at low temperatures. In addition, the resonator unit 2 and the interior of the housing 6 can be heated uniformly.

Although the present invention has been described above by taking a fast speed axial flow-type gas laser device as an example, the present invention is not limited to such a gas laser device and is applicable to a solid-state laser or a semiconductor laser. The present invention is further applicable to any type of device as long as the device may contain a heat-generating structural unit which is sealed in a housing and generates heat, and cool the housing in cooperation with heat exchangers and fans.

Advantageous Effects of Invention

According to the first aspect of the present invention, since the fan is arranged at least at one of two opposite positions across both the resonator unit and the heat exchanger in the housing, it is possible to generate airflow in one direction, which passes through both the resonator unit and the heat exchanger. In addition, the fan control unit can switch the direction in which air is blown by the fan, based on the temperature of the resonator unit. When, e.g., the temperature of the resonator unit is lower than that of the heat exchanger, heat generated by the heat exchanger can be applied to the resonator unit by changing the direction in which air is blown by the fan to the direction from the heat exchanger to the resonator unit. This makes it possible to shorten the time taken for the laser oscillator to become usable after the activation or restart of the laser oscillator at low temperatures.

According to the second aspect of the present invention, when the temperature of the resonator unit is equal to or higher than that of the heat exchanger, the heat exchanger is enabled to remove heat from the air surrounding the resonator unit by changing the direction in which air is blown by the fan to the direction from the resonator unit to the heat exchanger. On the other hand, when the temperature of the resonator unit is lower than that of the heat exchanger, heat generated by the heat exchanger can be applied to the resonator unit by changing the direction in which air is blown by the fan to the direction from the heat exchanger to the resonator unit.

According to the third aspect of the present invention, the resonator unit can be uniformly heated by arranging a plurality of fans in the longitudinal direction of the resonator unit and changing the air volume of at least one of the plurality of fans based on the temperature of the resonator unit.

According to the fourth aspect of the present invention, the resonator unit can be uniformly heated by arranging a plurality of fans in the longitudinal direction of the resonator unit and stopping at least one of the plurality of fans based on the temperature of the resonator unit.

In other words, according to the above-described third and fourth aspects, the temperature distribution of the resonator unit is experimentally obtained in advance or obtained by a plurality of temperature measuring units arranged over the entire resonator unit. A larger amount of hot air can be supplied to portions of the resonator unit having relatively low temperatures, based on such a temperature distribution. As a result, since the resonator unit can be heated uniformly, the operation of the laser oscillator can be stabilized.

According to the fifth aspect of the present invention, a cooling liquid temperature measuring unit which measures the temperature of a cooling liquid is provided and the temperature of the cooling liquid is set to a predetermined temperature. The direction in which air is blown by the fan can be switched based on the comparison result between the temperatures of the cooling liquid and the resonator unit.

According to the sixth aspect of the present invention, the temperature of the cooling liquid can be maintained constant independently of the ambient temperature by providing a chiller for controlling the cooling liquid at a constant temperature.

Although a typical embodiment has been described above, the present invention is not limited to the above-mentioned embodiment, and this embodiment could be changed into, e.g., various forms, structures, and materials without departing from the principle of the present invention.

What is claimed is:
1. A laser oscillator comprising:
a resonator unit configured to resonate a laser beam to be output;
a heat exchanger which is arranged adjacent to the resonator unit and is to be supplied with a cooling liquid;
a fan which is arranged at least at one of two opposite positions across both the resonator unit and the heat exchanger and generates airflow in one direction, which passes through both the resonator unit and the heat exchanger;
a resonator temperature measuring unit which measures a temperature of the resonator unit; and
a fan control unit which controls the fan,
wherein the fan control unit switches a direction in which air is blown by the fan, based on the temperature of the resonator unit measured by the resonator temperature measuring unit.
2. The laser oscillator according to claim 1, wherein
when the measured temperature of the resonator unit is lower than a predetermined temperature, the fan control unit adjusts the direction in which the air is blown by the fan to a direction from the heat exchanger to the resonator unit, and
when the measured temperature of the resonator unit is not lower than the predetermined temperature, the fan control unit adjusts the direction in which the air is blown by the fan to a direction from the resonator unit to the heat exchanger.
3. The laser oscillator according to claim 1, wherein
the fan comprises a plurality of fans and the plurality of fans are arranged in a longitudinal direction of the resonator unit, and
the fan control unit further changes an air volume of at least one of the plurality of fans, based on the measured temperature of the resonator unit.
4. The laser oscillator according to claim 1, wherein
the fan comprises a plurality of fans and the plurality of fans are arranged in a longitudinal direction of the resonator unit, and
the fan control unit further stops at least one of the plurality of fans, based on the measured temperature of the resonator unit.
5. The laser oscillator according to claim 2, further comprising a cooling liquid temperature measuring unit which measures a temperature of the cooling liquid,
wherein the predetermined temperature is equal to the temperature of the cooling liquid measured by the cooling liquid temperature measuring unit.
6. The laser oscillator according to claim 1, further comprising a chiller configured to control the cooling liquid at a constant temperature.

* * * * *